United States Patent [19]

De Vries

[11] Patent Number: 4,813,847
[45] Date of Patent: Mar. 21, 1989

[54] METHOD OF STORING AND AFTERWARDS COLLECTING ORDERS

[75] Inventor: Hugo V. De Vries, EP Ermelo, Netherlands

[73] Assignee: Technisch Ontwikkelingsbureau Van Elten B.V., AA Barneveld, Netherlands

[21] Appl. No.: 50,005

[22] PCT Filed: Aug. 18, 1986

[86] PCT No.: PCT/NL86/00026
§ 371 Date: Apr. 10, 1987
§ 102(e) Date: Apr. 10, 1987

[87] PCT Pub. No.: WO87/01102
PCT Pub. Date: Feb. 26, 1987

[30] Foreign Application Priority Data

Aug. 19, 1985 [NL] Netherlands .......................... 8502276

[51] Int. Cl.⁴ .......................... B65G 1/06; B65G 1/137
[52] U.S. Cl. .................................. 414/786; 414/281; 414/788.4; 414/791; 414/795.4
[58] Field of Search ................ 414/276, 285, 281–283, 414/286, 37, 112, 114, 786, 32, 52; 198/372

[56] References Cited

U.S. PATENT DOCUMENTS

| | | | |
|---|---|---|---|
| 3,198,308 | 8/1965 | Driesch et al. | 198/372 X |
| 3,282,398 | 11/1966 | Skoli et al. | 414/112 |
| 3,407,926 | 10/1968 | Rosser | 414/276 X |
| 3,434,604 | 3/1969 | Haldimann et al. | 414/281 |
| 3,520,424 | 7/1970 | Lemelson | 414/276 X |
| 3,534,850 | 10/1970 | Rogers et al. | 414/276 X |
| 3,656,635 | 4/1972 | Schafer et al. | 414/114 |
| 3,753,507 | 8/1973 | James et al. | 414/276 |
| 4,161,368 | 7/1979 | Batzdorff | 414/114 |
| 4,234,281 | 11/1980 | Lanham et al. | 414/37 |
| 4,307,988 | 12/1981 | Page et al. | 414/276 |
| 4,527,937 | 7/1985 | Tomasello, Jr. | 414/276 X |
| 4,712,964 | 12/1987 | Van Elten et al. | 414/281 |

FOREIGN PATENT DOCUMENTS 8001352 3/1980 Netherlands .
8004549 8/1980 Netherlands .

Primary Examiner—Frank E. Werner
Assistant Examiner—David A. Bucci
Attorney, Agent, or Firm—Ladas & Parry

[57] ABSTRACT

A method for storing and afterwards collecting orders consisting of products packed in crates and the like, with the aid of a staging with a number of storage conveyors. The crates and the like are stored as partial stacks, after which two or more partial stacks are stacked to form a full stack, which is delivered as such.

1 Claim, 4 Drawing Sheets

METHOD OF STORING AND AFTERWARDS COLLECTING ORDERS

BACKGROUND OF THE INVENTION

The invention relates to a method for storing and afterwards collecting orders, consisting of articles packed in crates or plastic baskets.

Particularly in the United States of America there are many companies which pack their products in crates or baskets, which are formed to stacks, which stacks are then placed for transport on e.g. dolly's, i.e. low carts having two or more swivelling wheels, or further conveyed over driven conveyor tracks recessed into the floor.

These stacks, which will be called full stacks from now on, as a rule have a height corresponding to the available height in the trucks, with which these stacks are transported to the buyers. In dairy factories, these stacks generally comprise six crates, but in bread factories and the like they comprise a larger number of baskets, often sixteen.

Since these stacks are formed shortly after the packing line, they consist of crates, boxes or baskets containing only one type of article, e.g. only whole milk. However, a buyer often orders a great variety of articles. The number of crates containing one type of article that has to be delivered, is generally smaller than the number of crates in a full stack.

Therefore the stacks formed after the packing line have to be conveyed to a spot where a large part of these full stacks has to be destacked in order to form full stacks again together with numbers of crates containing another article on the basis of the order forms.

Would the stacks have been smaller, then it would more often occur that a once-formed stack does not have to be destacked because the smaller number of crates of these lower stacks, which contain the article in question, does not exceed the number of crates ordered. At the most, a few crates have to be added. It is very useful to choose such a height for these smaller stacks, which will be called partial stacks from now on, that two or more partial stacks together form a full stack.

The partial stacks could have the drawback that if large quantities of one type of article have to be delivered, these partial stacks have to be stacked to form full stacks. This is not necessary if the crates are stacked to full stacks at once. However, internal conveyance of full stacks often causes damage due to toppling over. Now it is an important advantage that the partial stacks are far more stable and cannot cause damage due to toppling over.

The invention relates to a method for storing and then collecting orders, consisting of products packed in crates or baskets and the like, with the aid of a staging, comprising storage conveyors positioned in rows adjacent to and in layers above each other, on the one side of the staging at least one supply conveyor and at least one entry elevating device, being movable along the staging and comprising an introducing device and a driving means for the conveyance over the storage conveyors and on the other side of the staging at least one discharge conveyor and at least one exit elevating device, also being movable along the staging and comprising a removing device and a driving means for the storage conveyors.

Such a method is known from Dutch application Nos. 80,01352 and 80,04549, now European Patent No. 00 35818, and now U.S. Pat. No. 4,712,964; which is incorporated herein by reference, in which only single crates are stored and from which all the orders are compiled. Although very suitable in those cases in which the orders consist for the greater part of one or a few crates or baskets, this installation is expensive due to the manner of storing and the large number of storage tracks required especially in those cases, in which the orders substantially comprise a plurality of crates per article.

The invention aims to remove the drawbacks of this known method.

SUMMARY OF THE INVENTION

This object is attained in that according to the invention the crates, boxes or baskets are stored as partial stacks, in which two or more partial stacks can be stacked to form a full stack, which is delivered as such.

In the method according to the invention, partial stacks are formed after the packing lines and these are stored in layers above one another in an installation similar to the one described above. Then the number of storage tracks required for a certain storage volume is considerably smaller than for storing single crates. The the costs of storing partial stacks are also considerably lower than for storing single crates.

The following is also an advantage. Since a stack of crates, i.e. a number of crates at the same time, is introduced or delivered, the number of crates being processed per time unit is also considerably higher than is the case with single crates. On account of this the number of components, such as elevators and conveyors which introduce and exit the crates, can be restricted. This results in a further cost reduction.

It is also an advantage that a storage installation for stacks of crates takes up less height than one for singly stored crates. To the system, in which stacked crates are stored, belongs a system for enabling the collecting of single crates. Often this is a so-called flow rack, comprising inclined roll tracks positioned in rows adjacent to and in layers above each other and driven by gravity. If this flow rack is one of the automatically operating type, this often has to be extended by a hand-operated flow rack. By transferring articles by hand from one crate to the other it is then possible to collect also crates containing various products, if this is desired by the buyer.

The invention will be elucidated on the basis of the drawing by means of an embodiment.

DESCRIPTION OF A PREFERRED EMBODIMENT

Figure 1:
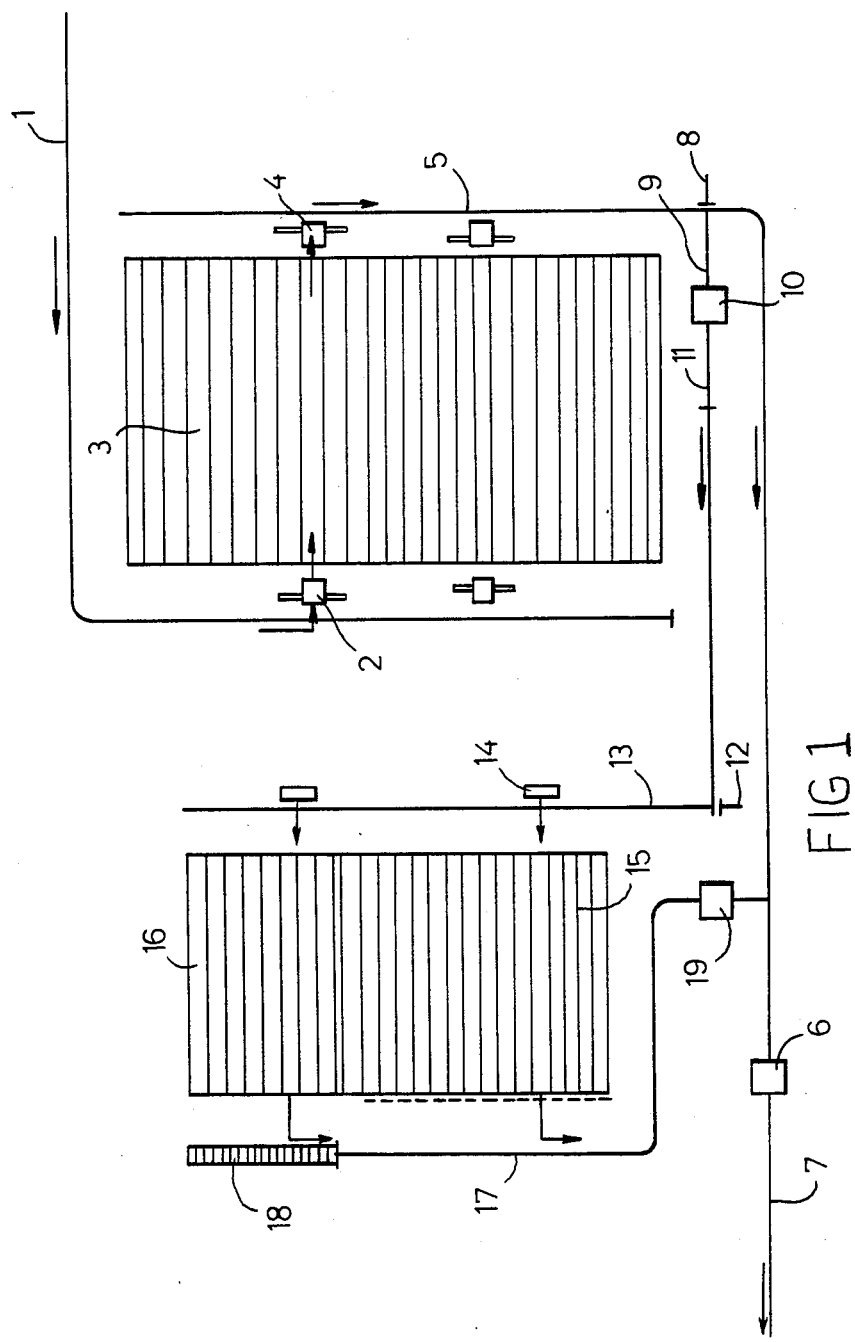
FIG. 1 shows a schematic top view of a storage device with a flow rack for applying the method according to the invention.

Via one or more conveyors 1, partial stacks of crates or baskets are conveyed from the packing lines to one or more entry elevators 2, after which these entry elevators enter the arrived partial stacks in the destined layer of the storage device 3. On the other side of the storage device 3, one or more collecting elevators 4 take the partial stacks required for one or more orders from the storage device 3 and transfer them onto the collecting conveyor 5, after which a part of the stacks is conveyed to a stacking device 6, forming a full stack of two or more of the oncoming partial stacks. Then these full stacks run over the conveyor 7 to the waiting truck or to a set-out room.

The shover 8 or transfer device can shove another part of the passing partial stacks onto a conveyor 9, after which the partial stacks are destacked to single crates or baskets in the destacking device 10. Over the conveyor 11 the crates reach the shover or transfer device 12, transferring the crates onto the dividing conveyors 13.

The shover or transferring device 14 movable along the high side of the row of gravity roll tracks 15 shoves the oncoming crates one by one onto the destined roll track of the automatic flow rack 15 or the hand-operated rack 16.

From the automatic flow rack 15 the crates required for one order are automatically transferred to the order collecting track 17 and conveyed further.

From the hand flow rack 16, articles are transferred by hand from the crates onto the roll tracks in a crate on the collecting track 18 according to instruction of e.g. a computer. Once the crate is filled with the articles required for that particular order, then this crate runs over the collecting tracks 18 and 17 after the already automatically transferred crates up to inside the stacking device 19, in which partial stacks are formed.

Via the conveyor 5 these partial stacks run up to inside the stacking device 6, in which the partial stacks are stacked to form full stacks, possibly in combination with partial stacks coming from the storage device 3.

Figure 2:
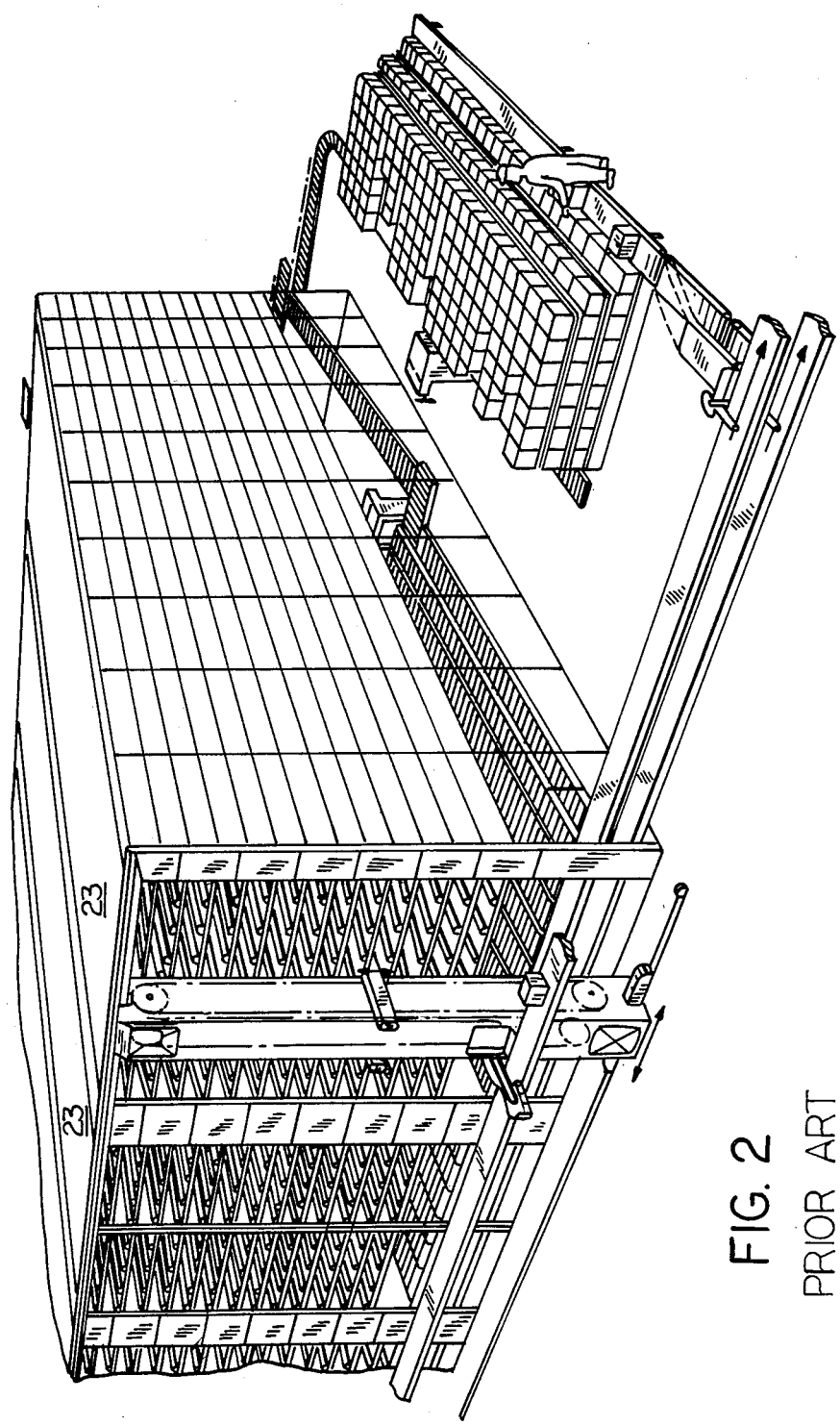
FIGS. 2, 3 and 4 show staging comprising storage conveyors.
Figure 3:
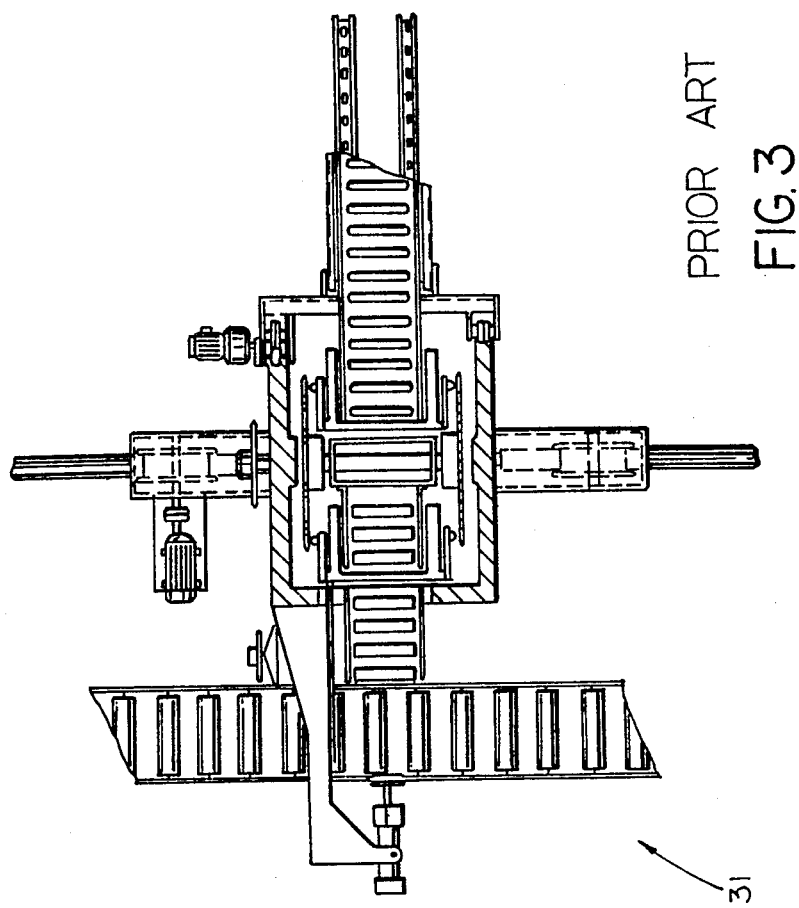
Figure 4:
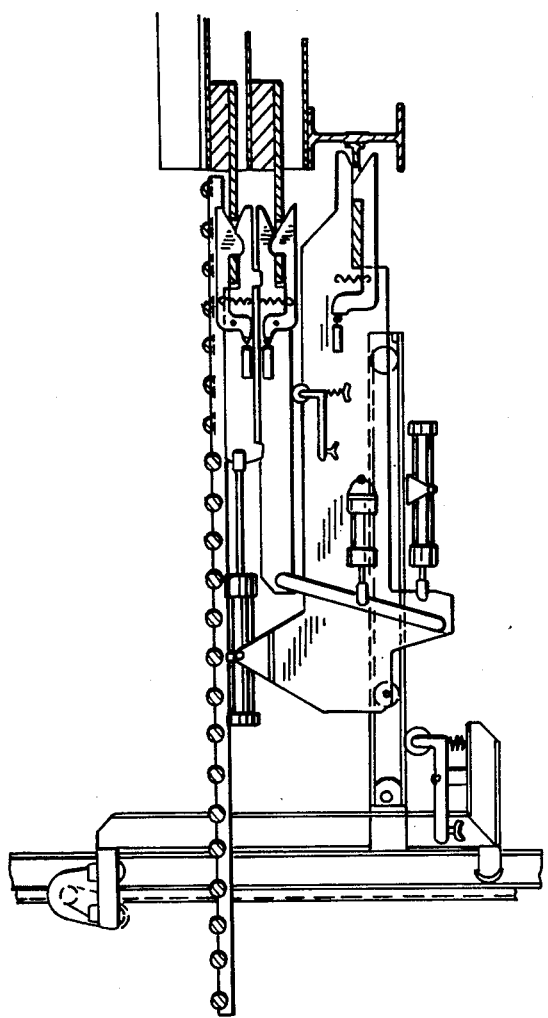

FIGS. 2 and 3 illustrate the staging comprising storage conveyors 23, 31 of the present invention.

I claim:

1. A method for storing and afterwards collecting orders consisting of products packed in crates or baskets using a staging comprising storage conveyors positioned in rows adjacent to and in layers above each other, on the one side of the staging, at least one supply conveyor and at least one entry elevating device being movable along the staging and comprising an introducing device and a driving means for the conveyance over the storage conveyors and on the other side of the staging at least one discharge conveyor and at least one exit elevating device, also being movable along the staging and comprising a removing device and a driving means for the storage conveyors, comprising the steps of:
    (a) storing the crates or baskets as first partial stacks of at least two items;
    (b) removing some partial stacks from the storage device and destacking them into single crates by means of a destacking device;
    (c) transporting the single crates or baskets to a flow rack;
    (d) forming second partial stacks from said single crates or baskets needed for an order;
    (e) combining said second partial stacks with first partial stacks, that are not destacked, coming from the storage device to form full stacks, having a height corresponding to the maximum height for transport.

* * * * *